United States Patent [19]

Dick et al.

[11] 3,884,707
[45] May 20, 1975

[54] PRINTING INK AND PROCESS
[75] Inventors: Franklin A. Dick, Princeton; Donald W. Miller, Middletown; Charles J. Miller, Hazlet, all of N.J.
[73] Assignee: Beatrice Foods Co., Chicago, Ill.
[22] Filed: Nov. 9, 1973
[21] Appl. No.: 414,438

[52] U.S. Cl. .................. 106/24; 106/30; 117/17.5; 117/155 UA; 117/156; 260/29.6 R; 260/29.6 B
[51] Int. Cl. ...................... C09d 11/04; C09d 11/08
[58] Field of Search .................. 117/155, 156, 17.5; 106/22–30; 260/29.6 R, 29.6 B

[56] References Cited
UNITED STATES PATENTS

| | | | |
|---|---|---|---|
| 2,343,781 | 3/1944 | Locke | 106/30 |
| 2,436,954 | 3/1948 | Denton | 106/26 X |
| 2,450,959 | 10/1948 | Heinecke | 106/30 |
| 3,615,752 | 10/1971 | Hoffman | 106/30 |

FOREIGN PATENTS OR APPLICATIONS

| | | | |
|---|---|---|---|
| 1,206,534 | 9/1960 | United Kingdom | 106/22 |

OTHER PUBLICATIONS

Apps, Inks for the Minor Printing Processes and Specialized Applications, V.3, Published by Leonard Hill, London, 1963, Pages 1,2–9,13,14,19–20,25–26,30 relied on, Z 247 A7 V.3.

*Primary Examiner*—Theodore Morris

[57] ABSTRACT

The invention provides a water based printing ink which is especially useful for rotogravure printing on groundwood paper.

14 Claims, No Drawings

PRINTING INK AND PROCESS

BACKGROUND

Printing is a highly developed art and printing ink compositions are subject to many variations and modifications depending upon the type of substrate to be printed and the type of printing presses. Basically there are three printing processes, namely, (a) typography which is printing from a raised surface, (b) planography which is printing from a substantially flat surface in which the printing areas have physical characteristics different from those of the non-printing areas, and (c) intaglio which employs depressed engraved plates in which the printing compositions are disposed in the depressions or recesses. Rotogravure printing is a form of intaglio printing which employs a curved etched cylinder. Even in intaglio printing the extremely viscous inks employed for copper or steel engravings, usually handwiped, are completely different in characteristics from the very fluid rotogravure inks used in high speed rotary intaglio printing.

The technology of printing has been described in various publications such as, for example, Printing Inks, Their Chemistry and Technology, by Carleton Ellis, Reinhold Publishing Corporation, 1940; and Voet, Ink and Paper in the Printing Process, Interscience Publishers 1952.

Various types of printing inks have been patented as disclosed, for example, in U.S. Pat. No. 1,962,823, in which an intaglio printing ink is prepared wherein the color is in the form of a pigment which is water insoluble and which is held in suspension by means of a binder. In pigmented inks the coloring matter normally has no affinity for the substrate to which it is applied but is held thereon by means of a binder. It has usually been considered that basic dyes which are water sensitive cannot be used satisfactorily in printing inks without combining them with a laking or mordanting agent. Tannic acid and other reagents have been used for this purpose. Also, where the printing composition contains very little water and the solvent is largely alcohol, rosin has been employed as disclosed, for example, in U.S. Pat. No. 2,343,781. Basic dyes have also been used in combination with naphthalene polysulfonic acids to make spirit soluble coloring compositions adapted for use in the production of typewriter ribbon, carbon paper, or writing fluids intended for use in spirit hectograph duplicating processes as disclosed, for example, in U.S. Pat. No. 2,727,825. In this case the polysulfonic acid reacts with the basic dye to produce a precipitated color. Basic dyes have also been disclosed for use in flexographic printing inks in which solvents are predominantly the lower alkanols such as ethanol and where very little, if any water is present as described in U.S. Pat. No. 3,353,972.

OBJECTS

One of the objects of the present invention is to provide a new and improved printing ink which is primarily water based and contains as the coloring agent an unlaked basic dye.

A further object of the invention is to provide a new and improved printing ink of the type described which has an affinity for groundwood paper based on the previously unrecognized fact that basic dyes are capable of undergoing chemical reaction with the lignin content in the paper to give a true paper-ink affinity.

Another object of the invention is to produce new and improved rotogravure printing inks.

Still a further object of the invention is to provide new and improved ink compositions which possess the advantages of having low odor level, low abrasion characteristics and very high flash points.

An additional object of the invention is to provide a new and improved process for printing on groundwood paper. Other objects will appear hereinafter.

BRIEF SUMMARY OF THE INVENTION

In accordance with the invention printing compositions are provided which are especially suitable for rotogravure printing and particularly for printing on groundwood paper which compositions consist essentially of a basic dye, water, an organic solvent, a resin and optionally ammonia or an amine, the pH being within the range from 7.0 to 11.5.

DETAILED DESCRIPTION OF THE INVENTION

For the purpose of the invention the printing compositions usually have a basic dye content within the range of 0.5 to 5% by weight, an organic solvent content within the range of 8 to 65% by weight, a water content of 15 to 85% by weight, and a resin content of 4 to 35% with or without the addition of ammonia or pH so that the alkalinity is within the range of pH 7 to 11.5.

Basic dyes are so-called because the actual coloring principle has a basic characteristic due to the amino groups present in the molecule either as free amino groups or amino groups alkylated in varying degrees. To insure good solubility, these dyes are usually marketed as the hydrochlorides or as salts of other acids. They can also be used as the free bases. Although basic dyes are usually considered to belong to a single class, chemically they fall into a number of different classes, namely,

| | |
|---|---|
| Triphenylmethane | Magenta (C.I.676) |
| Diphenylmethane | Auramine (C.I.655) |
| Acridine | Acridine Yellow (C.I.785) |
| Induline | Indamine Blue (C.I.859) |
| Oxazine | Meldola's Blue (C.I.909) |
| Thiazine | Methylene Blue (C.I.922) |
| Azine | Saffranine (C.I.841) |
| Azo | Bismarck Brown (C.I.331) |

The resorcine or phthaleine dyes, such as Rhodamine B (C.I. 749) and Eosine (C.I. 768), may also be grouped with the basic dyes, although they include members which are used not only as basic, but also as acid and mordant dyes.

For the purpose of the invention the preferred basic dyes are Victoria Blue B (C.I. 729), Auramine (C.I. 655), Methyl Violet (C.I. 680), Rhodamine B (C.I. 749), Rhodamine 6GDN (C.I. 752), and Victoria Blue R. These dyes are all well known in the dye art but according to Cockett and Hilton, Dyeing of Cellulose Fibers and Related Processes, Academic Press 1961, basic dyes have little or no substantivity for cellulosic fibers. Such fibers must first be treated with a substance which will form an insoluble complex with the dye and which acts as a key or bridge between the dye and fiber. Such substances are called "mordants." The authors also point out that these dyes as a class have relatively poor fastness to light and are of minor importance for the dyeing of cellulosic fibers.

It has been found, however, in the practice of the present invention that water based printing inks of the type herein described containing basic dyes are especially useful in printing on groundwood paper due to the previously unrecognized or overlooked fact that basic dyes are capable of undergoing chemical reaction with the lignin contained in the paper to give a true paper-ink substantivity.

The term "groundwood" as used herein and as defined by Ellis supra, refers to mechanically macerated pulp which contains all the original impurities (e.g., calcium oxalate, lignin, rosin, etc.) that were present in the wood.

The organic solvents employed in preparing printing compositions in accordance with the invention are preferably water miscible solvents such as, for example, ethylene glycol, diethylene glycol, the ethylether of ethylene glycol, the ethylether of diethylene glycol, n-propyl alcohol, isopropyl alcohol, and other water soluble glycols, glycol ethers and alcohols usually in admixture with one another, preferably within weight ratios of 1:3 to 3:1.

Examples of resins which can be employed in the printing ink compositions are maleated rosin, fumerated rosin, phenolic modified rosin, acrylic resins, proteins, shellac, polyethylene oxide, carboxyl methyl cellulose, polyvinyl alcohol and reconstituted starch. The resins are all soluble in the solvents used.

Examples of additives employed to provide alkalinity are ammonia, alkanolamines, e.g., monoethanolamine, diethanolamine, and alkylamines, e.g., diethylamine. Any water soluble amine can be used.

Optionally, defoaming agents, e.g., silicones, can be added in small amounts usually within the range of 0.01 to 1%.

Small quantities of pigments (up to 6% by weight) may also be used for color control.

The invention will be further illustrated but is not limited by the following examples in which the quantities are given in parts by weight unless otherwise indicated.

EXAMPLE I

A printing composition was prepared by mixing together the following ingredients in the proportions given:

| Ingredients | Percent by Weight |
| --- | --- |
| Calcium lithol pigment | 3 |
| Rhodamine B Dye | 2 |
| Defoamer | 0.5 |
| Maleated rosin | 15 |
| n-Propyl alcohol | 14 |
| Ethyl cellosolve | 14 |
| Water | 48.5 |
| Amine (Monoethanolamine) | 3.0 |

EXAMPLE II

A printing composition was prepared by mixing together the following ingredients in the proportions given:

| Ingredients | Percent by Weight |
| --- | --- |
| Victoria Blue B Dye | 5 |
| Defoamer | 0.5 |

-Continued

| Ingredients | Percent by Weight |
| --- | --- |
| Maleated rosin | 16 |
| n-Propyl alcohol | 15 |
| Ethyl cellosolve | 15 |
| Water | 45.3 |
| Amine (Monoethanolamine) | 3.2 |

The compositions illustrated in the examples were used with satisfactory results in rotogravure printing on groundwood paper. They can also be used as flexographic printing inks. Flexographic printing is a letter press process and is characterized by the fact that the ink is applied to the substrate by rotary rubber relief plates and rollers.

The invention is hereby claimed as follows:

1. A printing ink consisting essentially of a solution having an alkalinity within the pH range of 7.0 to 11.5 containing 0.5 to 5% by weight basic dye, 8 to 65% by weight water miscible organic solvent selected from the group consisting of ethylene glycol, diethylene glycol, ethylene glycol ethyl ether, diethylene glycol ethyl ether, n-propyl alcohol and isopropyl alcohol and other water soluble alcohols of the type of n-propyl and isopropyl alcohol, 15 to 85% by weight water, 4 to 35% by weight resin soluble in said water-organic solvent combination selected from the group consisting of maleated rosin, fumerated rosin, phenolic modified rosin, acrylic resins, proteins, shellac, polyethylene oxide, carboxyl methyl cellulose, polyvinyl alcohol and reconstituted starch, and 0 to 6% pigment, the total weight percentage being 100% and the alkalinity, if any, being imparted to said composition by the addition of ammonia or a water soluble amine selected from the group consisting of monoethanolamine, diethanolamine and diethylamine said ink being substantially free of laking agent.

2. A printing ink as claimed in claim 1 containing the following:

| Ingredients | Percent by Weight |
| --- | --- |
| Calcium lithol pigment | 3 |
| Rhodamine B Dye | 2. |
| Silicone defoamer | 0.5 |
| Maleated rosin | 15 |
| n-Propyl alcohol | 14 |
| Ethylene glycol ethyl ether | 14 |
| Water | 48.5 |
| Amine | 3.0. |

3. A printing ink as claimed in claim 1 containing the following:

| Ingredients | Percent by Weight |
| --- | --- |
| Victoria Blue B Dye | 5 |
| Silicone defoamer | 0.5 |
| Maleated rosin | 16 |
| n-Propyl alcohol | 15 |
| Ethylene glycol ether | 15 |
| Water | 45.3 |
| Amine | 3.2. |

4. A printing process which comprises printing on a groundwood paper with a composition as claimed in claim 1.

5. A printing process which comprises printing on a groundwood paper with a composition as claimed in claim 2.

6. A printing process which comprises printing on a groundwood paper with a composition as claimed in claim 3.

7. A printing process as claimed in claim 4 wherein rotogravure printing is employed.

8. A printing process as claimed in claim 4 wherein flexographic printing is employed.

9. A printing ink comprising a solution having an alkalinity within the pH range of 7.0 to 11.5 containing a basic dye, 8 to 65% by weight of a water miscible organic solvent selected from the group consisting of ethylene glycol, diethylene glycol, ethylene glycol ethyl ether, diethylene glycol ethyl ether, n-propyl alcohol and isopropyl alcohol and other water soluble alcohols of the type of n-propyl and isopropyl alcohol and 15 to 85% by weight of water, wherein the total weight percentage is 100% and the alkalinity, if any, being imparted to said composition by the addition of ammonia or a water soluble amine selected from the group consisting of monoethanolamine, diethanolamine and diethylamine, said link being substantially free of laking agent.

10. A printing ink as set forth in claim 9 containing about 0.5 to 5% by weight of said basic dye.

11. A printing ink as set forth in claim 9 wherein said basic dye is selected from the group consisting of Victoria Blue B, Auramine, Methyl Violet, Rhodamine B, Rhodamine 6GND, and Victoria Blue R.

12. A printing process which comprises printing on a ground wood paper with a composition as set forth in claim 9.

13. A printing ink as set forth in claim 9 containing up to 6% by weight of pigment.

14. A printing ink as set forth in claim 9 containing 4 to 35% by weight of a resin soluble in said water-organic solvent combination which is selected from the group consisting of pentamaleated rosin, fumerated rosin, acrylic resins, proteins and shellac.

* * * * *